(12) United States Patent
Rawlings et al.

(10) Patent No.: US 8,715,824 B2
(45) Date of Patent: May 6, 2014

(54) APPLIQUE

(75) Inventors: Diane C. Rawlings, Bellevue, WA (US); Bruce K. Keough, Kent, WA (US)

(73) Assignee: The Boeing Company, Chicago, IL (US)

( * ) Notice: Subject to any disclaimer, the term of this patent is extended or adjusted under 35 U.S.C. 154(b) by 1222 days.

(21) Appl. No.: 10/941,429

(22) Filed: Sep. 15, 2004

(65) Prior Publication Data

US 2005/0181203 A1 Aug. 18, 2005

Related U.S. Application Data

(60) Provisional application No. 60/507,546, filed on Sep. 30, 2003.

(51) Int. Cl.
*B32B 15/04* (2006.01)

(52) U.S. Cl.
USPC ........... 428/337; 428/457; 428/458; 428/460; 428/461

(58) Field of Classification Search
USPC ........ 428/423.1, 423.5, 423.7, 457, 458, 461, 428/425.8, 425.9, 337, 460; 244/1; 315/36; 317/2, 262; 174/2
See application file for complete search history.

(56) References Cited

U.S. PATENT DOCUMENTS

| | | | | | |
|---|---|---|---|---|---|
| 2,625,496 | A | * | 1/1953 | Swift et al. | 428/462 |
| 2,982,494 | A | * | 5/1961 | Amason | 244/1 A |
| RE25,417 | E | * | 7/1963 | Amason | 244/1 A |
| 3,238,087 | A | * | 3/1966 | Norwalk et al. | 428/417 |
| 3,416,027 | A | * | 12/1968 | Amason et al. | 315/36 |
| 3,438,127 | A | | 4/1969 | Lehtonen | |
| 3,480,231 | A | * | 11/1969 | Lumn | 244/1 R |
| 3,482,802 | A | * | 12/1969 | Lumn | 244/1 R |
| 3,498,572 | A | * | 3/1970 | Lumn | 244/1 A |
| 3,528,165 | A | * | 9/1970 | Abbott et al. | 228/111 |
| 3,532,652 | A | | 10/1970 | Zang et al. | |
| 3,721,597 | A | * | 3/1973 | Colburn | 156/313 |
| 3,755,713 | A | * | 8/1973 | Paszkowski | 361/218 |

(Continued)

FOREIGN PATENT DOCUMENTS

| EP | 0 119 780 A2 | 9/1984 |
|---|---|---|
| EP | 0 522 240 A2 | 1/1993 |

(Continued)

OTHER PUBLICATIONS

"Paintless aircraft technology", Aero. Eng'g, Nov. 1997, p. 17.

(Continued)

*Primary Examiner* — James J Seidleck
*Assistant Examiner* — Peter A Salamon
(74) *Attorney, Agent, or Firm* — Toler Law Group, PC

(57) ABSTRACT

According to a non-limiting embodiment of the present invention, an appliqué coating is provided for a substrate. The appliqué coating includes a metal foil and a first polymer film underlying the metal foil. A topcoat overlying the metal foil may be provided as a layer of paint or as a second polymer film. An adhesive, such as a pressure sensitive adhesive, underlying the first polymer film may be provided to affix the appliqué coating to the substrate. If desired, fibers may be dispersed throughout the second polymer film to provide anti-static properties. Also, an ink layer may be provided between the metal foil and the second polymer film, if desired, for aesthetic and/or anti-static purposes.

20 Claims, 5 Drawing Sheets

(56) References Cited

U.S. PATENT DOCUMENTS

| | | | |
|---|---|---|---|
| 3,906,308 A * | 9/1975 | Amason et al. | 361/218 |
| 3,989,984 A * | 11/1976 | Amason et al. | 361/212 |
| 4,043,878 A | 8/1977 | Ehrsam | |
| 4,186,237 A * | 1/1980 | Propp | 428/323 |
| 4,237,514 A * | 12/1980 | Cline | 361/117 |
| 4,352,142 A * | 9/1982 | Olson | 361/218 |
| 4,382,049 A * | 5/1983 | Hofmeister et al. | 264/40.1 |
| 4,429,341 A * | 1/1984 | King | 361/117 |
| 4,479,163 A * | 10/1984 | Bannink et al. | 361/218 |
| RE31,780 E | 12/1984 | Cooper et al. | |
| 4,502,092 A * | 2/1985 | Bannink et al. | 361/218 |
| 4,506,311 A | 3/1985 | Cline | |
| 4,522,889 A * | 6/1985 | Ebneth et al. | 428/614 |
| 4,645,697 A | 2/1987 | Torigoe | |
| 4,752,415 A * | 6/1988 | Iwaskow et al. | 252/511 |
| 4,755,904 A * | 7/1988 | Brick | 361/117 |
| 4,759,971 A * | 7/1988 | Weissberger et al. | 428/215 |
| 4,760,493 A * | 7/1988 | Pearson | 361/218 |
| 4,765,860 A * | 8/1988 | Ueno et al. | 156/272.6 |
| 4,774,148 A * | 9/1988 | Goto | 428/607 |
| 4,796,153 A * | 1/1989 | Amason et al. | 361/218 |
| 4,888,451 A * | 12/1989 | Toni et al. | 174/94 R |
| 4,986,496 A | 1/1991 | Marentic et al. | |
| 5,127,601 A * | 7/1992 | Schroeder | 244/1 A |
| 5,158,831 A * | 10/1992 | Schirmer | 428/457 |
| 5,219,629 A * | 6/1993 | Sobolev | 428/35.9 |
| 5,370,921 A * | 12/1994 | Cedarleaf | 428/138 |
| 5,397,618 A * | 3/1995 | Cedarleaf | 428/138 |
| 5,451,252 A | 9/1995 | Elfenthal et al. | |
| 5,468,699 A | 11/1995 | Zhang et al. | |
| 5,470,413 A * | 11/1995 | Cedarleaf | 156/90 |
| 5,616,420 A * | 4/1997 | Yamaoka et al. | 428/515 |
| 5,660,667 A | 8/1997 | Davis | |
| 5,698,316 A * | 12/1997 | Kuras et al. | 428/344 |
| 5,872,415 A | 2/1999 | Dreifus et al. | |
| 6,114,050 A * | 9/2000 | Westre et al. | 428/608 |
| 6,136,441 A | 10/2000 | MacGregor et al. | |
| 6,168,732 B1 | 1/2001 | Ardakani et al. | |
| 6,177,185 B1 * | 1/2001 | Face, Jr. | 428/325 |
| 6,177,189 B1 * | 1/2001 | Rawlings et al. | 428/343 |
| 6,218,006 B1 | 4/2001 | Tokunaga et al. | |
| 6,258,918 B1 * | 7/2001 | Ho et al. | 528/66 |
| 6,280,671 B1 | 8/2001 | Benz et al. | |
| 6,451,441 B1 * | 9/2002 | Nishimoto et al. | 428/461 |
| 6,558,528 B1 * | 5/2003 | Matzinger | 205/777.5 |
| 6,706,355 B2 | 3/2004 | Holguin et al. | |
| 7,050,286 B2 | 5/2006 | Pridham et al. | |
| 7,172,785 B2 * | 2/2007 | Thompson et al. | 427/2.31 |
| 2002/0081921 A1 * | 6/2002 | Vargo et al. | 442/16 |
| 2004/0229607 A1 | 11/2004 | La Chapelle et al. | |
| 2005/0041362 A1 | 2/2005 | Hall | |
| 2005/0142318 A1 | 6/2005 | Nakabayashi et al. | |
| 2005/0150596 A1 | 7/2005 | Vargo et al. | |
| 2005/0175833 A1 | 8/2005 | Yoneda | |
| 2005/0181203 A1 | 8/2005 | Rawlings et al. | |

FOREIGN PATENT DOCUMENTS

| | | |
|---|---|---|
| EP | 0 522 663 A1 | 1/1993 |
| EP | 0 580 417 A1 | 1/1994 |
| EP | 1 332 867 A1 | 8/2003 |
| GB | 1 580 321 | 12/1980 |
| WO | WO-90/01857 A1 | 2/1990 |
| WO | 9424219 A2 | 10/1994 |
| WO | WO-99/65674 A1 | 12/1999 |
| WO | WO 00/67994 * | 11/2000 |
| WO | WO 0067994 A1 * | 11/2000 |
| WO | 2005032812 A2 | 4/2005 |

OTHER PUBLICATIONS

"Fulmen Project Final Report for Publication", European Commission project under the Transport RTD Programme of the 4th Framework Programme, Dec. 3, 2002.

General Electric Plastics web page, http://www.geplastics.com.hk/hkenglish/techsolution/productAssembly/aesthetic_decor/, Oct. 11, 2002.

Communication of Notices of Opposition (R. 79(1) EPC), EP Application No. 06254833.4-1301 / 1767344, European Patent Office, Feb. 13, 2013.

International Search Report for International Application No. PCT/US2004/030251, May 24, 2005, 7 pages.

* cited by examiner

APPLIQUE

CROSS-REFERENCE TO RELATED APPLICATIONS

This Application is a Non-Prov of Prov (35 USC 119(e)) application 60/507,546 filed on Sep. 30, 2003, the contents of which are incorporated by reference.

FIELD OF THE INVENTION

The present invention relates generally to appliqué1 and, specifically to appliqués for protection against lightning strike.

BACKGROUND OF THE INVENTION

Painting has long been the process of choice for applying coatings to surfaces, especially those having complex curvature. Painting is generally a controllable, reliable, easy, and versatile process. The paint can include additives to give the surface desired physical properties, such as gloss, color, reflectivity, or combinations thereof. The painting process is well understood and produces quality coatings having uniform properties even when the surface includes complex curvature. However, painting is falling under closer environmental scrutiny because paints use volatile solvents to carry the binder and pigments or because of the binder precursors and pigments themselves. Therefore, there is a need to replace the painting process with a process that has less environmental impact. Furthermore, while painting is well defined, well understood, and common, it remains an "art" where masters produce better products than novices or apprentices without necessarily being able to account for why or to teach others how.

Painted surfaces sometimes lack the durability that quality-conscious customers demand. The surface must be treated and cleaned prior to applying the paint. The environment surrounding the part must be controlled during application of the coating, often requiring a spray booth. Painted coatings are also vulnerable to damage like cracks or scratches. Isolated damage may require the repair of a large area, such as forcing the repainting of an entire panel.

Spraying inherently wastes paint and is unpredictable because of the "art" involved with the application. Improper application cannot be detected until the spraying is complete, then rework to correct a defect usually affects a large area even for a small deficiency. Furthermore, in the aerospace industry, painting requires specialized equipment and facilities that are expensive to construct and to operate. Painting takes an aircraft out of revenue-generating service. Painting can only be done where a paint hangar is available, and is relatively slow and inflexible.

In the context of aircraft, U.S. Pat. No. 4,986,496, the contents of which are incorporated by reference, describes a drag reduction article in the form of a conformable sheet material (a decal) with surface texturing for application to aircraft flow control surfaces to reduce aircraft drag. The material fits on curved surfaces without cracks, bubbles, or wrinkles because of paint-like properties of the basic carrier film. The decals are manufactured flat and are elongated to fit the intended curvature. If the appliqué deformation is not plastic, this elongation can be problematic over time if the stretched material shrinks to expose a gap between adjacent decals where weather can attack the decal-surface interface. Appliqués or decals must be plastically deformable or they will be limited to surfaces of slowly changing curvature.

Appliqués (i.e. decals) are also described in U.S. Pat. No. 5,660,667, the contents of which are incorporated by reference. Having complex curvature, the appliqués form complete, bubble-free, wrinkleless coverings on surfaces of complex curvature without excessive elongation. Lapping of appliqués is generally described in European Patent Application publication no. 1093409, the contents of which are incorporated by reference.

Often surfaces must be protected against corrosion. Such protection commonly involves surface treatments or primers (i.e. chromated primers or conversion coatings) that are relatively expensive because of the chemicals involved and the time associated with their application. These traditional coatings are relatively heavy, especially when coupled with other surface coatings that must be applied over the corrosion protection coating to provide color, gloss, enhanced surface durability, abrasion protection, a combination of these attributes, or other attributes. The chemicals used in conventional corrosion protection coatings often are hazardous materials.

Appliqués are of considerable interest today for commercial and military aerospace applications. Flight tests have been conducted on paintless aircraft technologies, such as appliqués. These appliqués save production costs, support requirements, and aircraft weight while providing significant environmental advantages. Some of these appliqués are described in greater detail in U.S. Pat. No. 6,177,189 and in an article entitled "Paintless aircraft technology," Aero. Eng'g, November 1997, p. 17, which are incorporated by reference. Further, some commercial airlines, like Western Pacific, use appliqués to convert their transports into flying billboards.

In addition to the above advantages, appliqués incorporating metal layers may also provide protection against lightning strike. A description of an appliqué providing protection against lightning strike is described in U.S. Pat. No. 4,352,142, which is incorporated by reference. Lightning strikes may potentially cause damage to aircraft—especially composite aircraft. A typical lightning strike on an aircraft may initially attach at a location such as a leading edge of an engine inlet cowl or the nose of the fuselage, collectively referred to as Zone 1. An initial Zone 1 lightning strike may be a rapid spike of electrical current with a peak amplitude on the order of around 200KA that may last for around 500 μSec or so (referred to as an "A" waveform).

As the aircraft flies through the plasma field of the lightning, the lightning may reattach aft of the Zone 1 strike at locations such as an engine exhaust outlet (referred to as Zone 2) or on a wing skin (referred to as Zone 2 or 3 depending on the location). Zone 2 reattachment can experience a continuing current charge transfer of up to about 10 coulombs over a period of time on the order of around 5 milliSec or so (referred to as a "B" waveform). Zone 3 reattachment can experience a continuing current charge transfer of up to about 200 coulombs over a period of time between around 0.25 Sec and around 1 Sec or so (referred to as a "C" waveform).

A restrike can occur at any Zone and is referred to as a "D" waveform. A "D" waveform restrike may be a rapid spike of electrical current with a peak amplitude on the order of around 100KA that may last for around 500 μSec or so.

A major concern is to protect against a "D" waveform restrike in Zones 2 or 3-especially in the vicinity of a fastener that extends into a wing box that may be wetted with fuel. Another concern is to mitigate damage to composites that may be caused by the continuing currents of the "B" and "C" waveforms.

For example, U.S. Patent Application Publication No. 2002/0081921 by Vargo et al. (the contents of which are incorporated by reference) describes an appliqué that includes a polymeric sheet material, such as a halopolymer fabric, that is adhered to or bonded to a metal layer, such as a metal mesh or an expanded metal foil. The metal layer is adhered directly with an adhesive to a nonmetallic substrate, such as a composite material used in an aircraft structure. In the event of a lightning strike, energy from the lightning is dispersed over a large surface area, thereby mitigating localized damage to the nonmetallic substrate. However, because the metal layer is adhered directly to the nonmetallic substrate, the energy from the lightning strike is maintained in contact with the nonmetallic substrate. As a result, a large surface of the nonmetallic substrate may be placed in contact with large amounts of energy from the lightning strike.

It would also be desirable to mitigate effects of static charge developed during flight. As an aircraft flies through the air, electrons in air molecules may be forcibly dislodged from their orbits by impact with the skin of the aircraft. The electrons may be stored on the composite skin of the aircraft and impart a static charge, referred to as a P-static charge. This P-static charge may possibly result in personnel injury if a person were to contact an aircraft skin after landing but before the aircraft were electrically grounded. Further, discharge of the P-static charge may result in electrical noise that can interfere with electronic systems of the aircraft.

Accordingly, it may be desirable to increase lightning strike protection afforded by an appliqué and/or simultaneously mitigate static charging. However, there is an unmet need in the art for a low-cost appliqué that provides increased protection from lightning strike to an underlying surface, and/or that mitigates static charging.

SUMMARY OF THE INVENTION

Embodiments of the present invention provide appliqués that may be used as a surface coating, such as a low cost replacement for paint. Advantageously, the appliqués of the present invention provide a metal foil for protection against lightning strikes and/or mitigation of P-static charging. Further, the metal foil is spaced apart from an underlying substrate by a dielectric layer. As a result, the appliqués of the present invention provide increased protection from lightning strike than previous appliqués. The appliqués of the present invention could be well suited to aircraft and to many other areas, such as automobiles, boats, architectural coatings, and other commercial products.

According to a non-limiting embodiment of the present invention, an appliqué coating is provided for a substrate. The appliqué coating includes a metal foil and a first polymer film underlying the metal foil. A topcoat overlying the metal foil may be provided as a layer of paint or as a second polymer film. An adhesive, such as a pressure sensitive adhesive, underlying the first polymer film may be provided to affix the appliqué coating to the substrate. If desired, fibers may be dispersed throughout the second polymer film to provide anti-static properties. Also, an ink layer may be provided between the metal foil and the second polymer film, if desired, for aesthetic and/or anti-static purposes.

According to aspects of the present invention, the metal foil includes aluminum foil but may also include copper or other metals. The first polymer film may include any one or a combination of polyamide (nylon), poly ether ether ketone (PEEK), polysulfonate, polyesters such as poly ethylene terephthalate (PET) or poly ethylene naphthalate (PEN), polyimide, polyolefins such as polyethylene or polypropylene, polyurethane, halopolymer, and a two-layer polymer film combination such as a polyester/polyethylene combination, polyester/nylon combination, PEEK/polyethylene combination, and a PEEK/nylon combination. The second polymer film may include any one or a combination of polyurethane, polyamide (nylon), polyolefin, halopolymer including both plastics and elastomers, epoxy, fluorosilicone, fluorourethane, polyester, polyimide, poly ether ether ketone (PEEK), and polyurea. If desired, the second polymer film may be cast with a solvent to increase porosity, thereby enhancing static charge migration to the metal foil.

According to another embodiment of the present invention, an appliqué coating assembly is provided for a substrate that has a fastener extending therethrough. The appliqué coating assembly includes an appliqué coating and a dielectric layer underlying the appliqué coating. The dielectric layer is arranged to be interposed between the appliqué coating and a head of the fastener. The dielectric layer increases the dielectric withstand voltage over the fastener and can help increase protection against lightning strike in the vicinity of fasteners. This increased protection against lightning strike may be desirable, for example, for fasteners that extend through skin of an aircraft wing into a wing box that may be wetted with fuel.

DETAILED DESCRIPTION OF THE INVENTION

Figure 1:
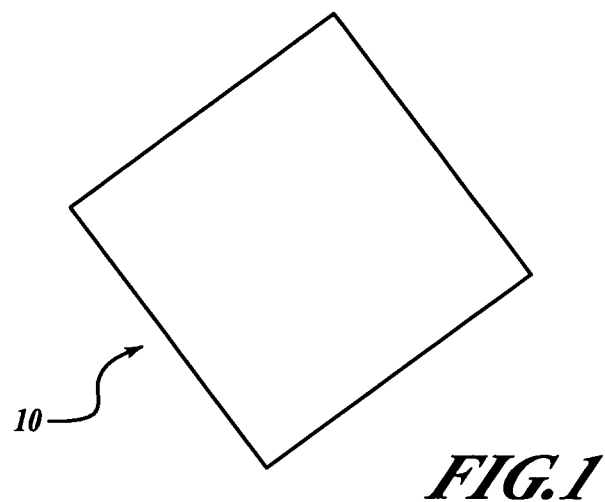
FIG. 1 is a schematic plan view of an appliqué gore.
Figure 2:
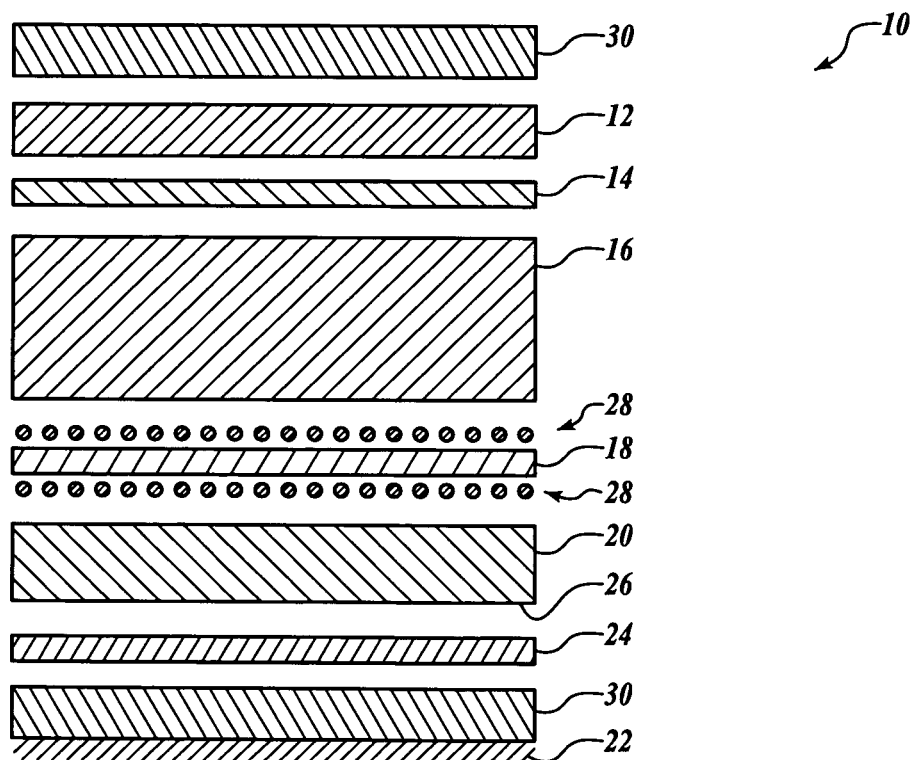
FIG. 2 is a schematic cross-section of the appliqué of FIG. 1.

By way of overview and referring to FIGS. 1 and 2, according to a non-limiting embodiment of the present invention, an appliqué coating 10 is provided for a substrate 22. The appliqué coating 10 includes a polymer film 12 arranged as an outer layer or topcoat and a vapor barrier film 18 made of metal foil. A pressure-sensitive adhesive 24 is arranged as another outer layer for adhesive attachment to the substrate 22. A polymer film 20 is disposed between the vapor barrier film 18 and the pressure-sensitive adhesive 24. FIG. 2 may not be drawn to scale in order to emphasize features that may enhance understanding of the present invention. Details will first be explained regarding exemplary components of the appliqué 10, followed by explanations of preferred and alternate implementations of appliqués according to exemplary embodiments of the present invention.

A polymer film 12 provides an external film or topcoat. The polymer film 12 is typically an organic resin matrix elastomeric composite. Given by way of non-limiting example, the polymer film 12 is suitably polyurethane, fluorinated urethane, polyurea, polyester, polyamide, PEEK, fluoropolymer or chloropolymer. The polymer film 12 is suitably tough, durable, and resistant to weather. For example, the polymer film 12 suitably provides increased durability and hardening to the vapor barrier film 18. Similarly, the polymer film 12 may be markable so that removable indicia can be imprinted thereon. Alternately, the polymer film 12 may be transparent.

Transparency may be desired when color or graphic patterns are included in layers underneath the polymer 12. If desired, graphic patterns may be imbedded within the polymer film 12.

In addition, the polymer film 12 may contribute to aesthetic qualities, such as gloss or color through appropriate pigments. Generally, the pigments suitably are metal flakes, metal oxide particles, organic pigments or dies, or organometallic particles, and typically are mixtures of several types of material. Suitable aluminum flake pigments include the Aquasil BP series of pigments available from Siberline Manufacturing Co. The pigments might be glass, mica, metals (like nickel, cobalt, copper, bronze, and the like available from Novamet) or glass flake, silver coated glass flake, mica flake, or the like available from Potters Industries, Inc. These flakes typically are about 17-55 μm for their characteristic dimension. In some applications, ceramic pigments may be appropriate. The pigments can be mixed to provide the desired characteristics for the coating.

Titanox 2020 titanium oxide pigments are available from NL Industries. Copper oxide or iron oxide pigments are available from Fischer Scientific. NANOTEK titania, zinc oxide, or copper oxide pigments are available from Nanophase Technologies Corporation. These pigments are generally spherical with diameters in the range from about 30 μm (for the NANOTEK pigments) to micron sizes.

The polymer film 12 suitably may be made from polyurethane or fluorinated urethane, if desired. Alternately, as discussed above, the polymer film 12 may be a fluoropolymer or fluoroelastomer. One presently preferred topcoat of the polymer film 12 is a fluoroelastomer, such as a modified CAAP-COAT Type III or Type IV rain and thermal resistant fluoroelastomer available from the CAAP Company and suitable for roll coating in desired colors and with any desired additives (such as for anti-static characteristics, as described below). In addition, the polymer film 12 may be polyurethane, polyolefin, polyamide, polyimide, halopolymer, ethylene propylene rubber, epoxy, polyester (such as poly ethylene terephthalate (PET), poly ethylene naphthalate (PEN), or the like) fluorosilicone, polyether sulfone (PES), or poly ether ether ketone (PEEK). The polymer film 12 may be solvent cast, if desired. Fluoropolymers advantageously provide good water-shedding characteristics as well as increased resistance to fluids, such as hydraulic fluids like SKY-DROL™, that may be present in or around aircraft. Polyamides, polyimides, polyesters, PEEK and the like also provide resistance to hydraulic fluids such as SKYDROL™. As also discussed above, the polymer film 12 suitably may also be a chloroelastomer. Regardless of the composition of polymer film 12, UV stability helps ensure long-term durability of the coating system provided by the appliqué 10.

The polymer film 12 is suitably a thin layer. For example, the polymer film 12 may be between 0.1-4 mils (0.0001-0.004 inch) thick. In one presently preferred embodiment, the polymer film 12 is around 1-2 mils thick. Thinner layers are desirable over thicker layers because of weight savings when the appliqué 10 is used on an aircraft.

Further, when the polymer film 12 is suitably thin and porous, the polymer film 12 can aid in anti-static properties of the appliqué 10. If desired, anti-static material may be disposed within the polymer film 12. For example, electrically conductive material, such as without limitation graphite fibers or metal fibers, may be dispersed throughout the polymer film 12. The fibers disperse and dissipate the P-static charge, thereby mitigating buildup of the P-static charge in a localized area. This dispersion and dissipation reduces the possibility of electrical discharge which is a source of electrical noise to various communication systems onboard aircraft during flight. This dispersion and dissipation also reduces the possibility of personnel injuries if a person contacts the skin of an aircraft after the aircraft lands but before the aircraft is electrically grounded.

If desired, an optional ink layer 14 may be provided. The ink layer 14 may provide a desired color and/or graphic design. Alternately, the ink layer 14 may provide color to the polymer film 12 that overlays the optional ink layer 14. Advantageously, the ink layer 14, if provided, may provide anti-static characteristics to the appliqué 10.

Alternately, it may be desirable in some cases to paint over the polymer film 12 instead of providing the ink layer 14. In these instances, the polymer film 12 may have a matte texture. The matte texture enhances adhesion of paint to the polymer film 12.

If further desired, a polymer film 16 may be provided. The optional polymer film 16 may be used for any desired purpose. For example, a graphic image may be printed in the polymer film 16. The polymer film 16 may be made of the same materials and processed as discussed herein for the polymer film 12.

The polymer films 12 and 16 may be extruded or cast. When the polymer films 12 and 16 are cast with solvent, the polymer films 12 and 16 are microporous and can provide a path for migration of P-static charges to the vapor barrier film 18. As a result, the vapor barrier film 18 can provide anti-static characteristics. Regardless of the static charge transport mechanism, the static charge advantageously is dispersed over a wide area. As discussed above, this dispersion helps reduce the possibility of induction of electrical noise in electronic circuits inside the aircraft during flight and also helps reduce possibilities of personnel injuries if a person contacts the skin of an aircraft after the aircraft lands but before the aircraft is electrically grounded.

Advantageously, according to embodiments of the present invention, the vapor barrier film 18 is made of a metal foil. Given by way of non-limiting example, the metal suitably includes aluminum, such as aluminum foil. For optimum use as a vapor barrier and for protecting against lightning strike, the vapor barrier 18 should permit the appliqué 10 to elongate and to conform to surfaces of compound curvature. Given by way of non-limiting example, high-quality foil such as rolled aluminum foil may be used as the vapor barrier film 18. Foil with a thickness between around 0.1 mil and around 0.75 mil suitably may be used, and foil with a thickness between around 0.25 mil and around 0.5 mil is presently preferred.

However, the vapor barrier film 18 may be made of any metal foil as desired, such as without limitation, copper, nickel, gold, or titanium. Because the vapor barrier film 18 is a metal foil, the vapor barrier film 18 advantageously is provided at low cost. Also, the metal foil provides increased integrity over vapor barriers that may be provided via metallized deposition, such as physical vapor deposition or sputtering, or via expanded mesh. Because metal foil is readily available, the vapor barrier film 18 costs less than metallized vapor barriers that entail deposition in a vacuum chamber. Further, because the metal foil is metal instead of a metallized material or expanded mesh, the vapor barrier film 18 provides increased conductivity and uniformity over metallized vapor barriers or expanded mesh. While the vapor barrier film 18 may be thicker than metallized vapor barriers, thickness of the vapor barrier film 18 nonetheless may be less than 1 mil thick. For example, in one present embodiment, the vapor barrier film 18 may be less than around 0.3 mils thick.

Advantageously, the vapor barrier film 18 also provides anti-static properties and provides elongation control and stiffness to the appliqué 10. In one exemplary embodiment, the vapor barrier film 18 allows substantial elongation, on the order of around ten percent to around forty-five percent, during application of the appliqué 10 to a complex shape. In addition, the vapor barrier 18 advantageously provides complete UV opacity and, as a result, UV protection for an underlying composite structure.

Advantageously, according to embodiments of the present invention a polymer film 20 underlies the vapor barrier film 18. The polymer film 20 suitably is made from any of the same materials as the polymer film 12 or the polymer film 16, as desired for a particular application. If desired, the polymer film 20 may also be a poly ether ether ketone (PEEK) film, polysulfonate, polyester, polyamide, polyimide, polyethylene, polypropylene or any combination thereof.

In one presently preferred embodiment, the polymer film 20 is made of nylon. Advantageously, nylon provides a moderately high dielectric strength of approximately 385 volts per mil, is sufficiently resistant to hydraulic fluids such as SKYDROL™, can bind readily to other materials, and is available in high-quality, inexpensive films.

Alternately, the polymer film 20 may be made from a variety of other suitable materials. For example, the polymer film 20 can be made from polyimides. Advantageously, other materials can bond easily to polyimides. In addition, the polymer film 20 may be made from polyolefin, polyester, polyurethane, or halopolymer.

As a further example, the polymer film 20 can be polyethylene or polyester for applications typically in use in a wide range of temperatures, such as temperatures between around 70 degrees Fahrenheit and around 180 degrees Fahrenheit. Advantageously, plasma treating has been shown to effectively enhance bond strength of polyethylene and polyester to each other and to adhesives at low temperatures.

As another example, the polymer film 20 may be a two-layer polymer film combination. Given by way of non-limiting examples, the polymer film 20 may be a polyester/polyethylene combination, a polyester/nylon combination, a PEEK/polyethylene combination, a PEEK/nylon combination, or the like.

It is not necessary that the polymer film 20 be made from the same exact materials as the polymer film 12. Likewise, the polymer film 20 may be cast, extruded, or provided as a laminate, as desired. The polymer film 20 advantageously supports the vapor barrier film 18. Additionally, when the polymer film 20 optionally is a high modulus plastic, the polymer film 20 provides stiffness and elongation to the appliqué 10. The preferred thermoplastic polymer film 20 is low-cost, provides high dielectric strength, and is substantially free of holes for either air or other fluids, such as solvents, or electrical charge to be transported through.

If desired, any of the polymer films 12, 16, and/or 20 and/or the vapor barrier 18 may be plasma treated to enhance bonding. In a presently preferred embodiment, atmospheric treatment is preferred. The plasma treatment is performed in oxygen or another gaseous chemical.

According to embodiments of the present invention, the vapor barrier film 18 and the polymer film 20 cooperate to contribute to protection against lightning strike. Advantageously, laboratory testing has shown that the appliqué 10 provides superior lightning strike protection. In the event of a lightning strike, according to the present invention the vapor barrier film 18 and the polymer film 20 act in concert to keep energy from the lightning strike away from an underlying substrate 22, such as an aircraft skin. Embodiments of the present invention are thus well-suited to be applied to composite panels, such as without limitation fiber-reinforced resin composite panels or carbon fiber-reinforced composite panels, that may be used for aircraft skin or other applications as desired.

When lightning strikes the appliqué 10, electrical charges that impact the vapor barrier film 18 advantageously do not penetrate the polymer film 20. The polymer film 20 prevents energy from the lightning strike from arcing directly through the appliqué 10 to the underlying substrate 22. Instead, the polymer film 20 permits the vapor barrier 18 to disperse electrical charges throughout the vapor barrier film 18. As a result, energy stays on the appliqué 10 and spreads out substantially uniformly. Testing has shown that the attachment point of the energy moves about the lightning strike location.

This dispersion distributes the energy of the lightning strike over a large area, thereby lowering the charge density in any localized area. This aids in mitigating likelihood of the lightning penetrating through the polymer film 20 to the substrate 22. If the electrical energy does find a path to underlying structure, then advantageously the appliqué 10 has distributed the energy into many different, lower energy paths into the structure. As a result of the distribution of charges by the vapor barrier 18, dielectric strength of the polymer film 20 advantageously has been shown to withstand energy expected in lightning strikes in Zone 1 as well as Zone 2. Because the polymer film 20 has been shown to not experience dielectric breakdown as a result of exposure to the charges dispersed by the vapor barrier 18, the polymer film 20 is able to keep the charge separated from (and out of electrical contact with) the substrate 22. As a result of protection afforded by the appliqué 10, nondestructive evaluation (by pulse echo techniques) has shown that the substrate 22 advantageously can experience no damage from energy expected in lightning strikes in Zone 1 as well as Zone 2.

Further, this dispersion causes the vapor barrier film 18 to "pull up" and disbond from the polymer film 20 in some areas adjacent the lightning strike location. It will be noted that testing has shown the vapor barrier 18 to vaporize at the location of the lightning strike. As a result, energy from the electrical charges advantageously is vertically spaced apart and kept away from the substrate 22, such as an aircraft skin, underlying the polymer film 20.

A pressure sensitive adhesive (PSA) 24 suitably provides complete adhesion between the appliqué 10 and the substrate 22. The PSA 24 desirably is an adhesive that is resistant to jet fuels, cleaning fluids, water, and high humidity environments. If possible, the adhesive should be resistant to aircraft hydraulic fluids, such as SKYDROL™. In one presently preferred embodiment, the PSA 24 is a pressure sensitive acrylic adhesive, such as adhesive A8 available from The Boeing Company of Seattle, Wash. Alternately, other acceptable adhesives include 52-4 or 86-02 from the 3M Company of St. Paul, Minn. The PSA 24 suitably holds the appliqué 10 on the substrate 22 during normal operation of a vehicle, such as flight of an aircraft. However, the PSA 24 is also desirably peelable for replacement of the appliqué 10 without leaving a residue on the substrate 22.

Advantageously, thickness of the PSA 24 contributes to spacing apart the vapor barrier 18 and the second polymer film 20 from the substrate 22. As a result, thickness of the PSA 24 contributes to raising the dielectric breakdown voltage, thereby increasing protection against lightning strike.

A lower face of the polymer film 20 is provided with a surface treatment 26, such as without limitation a corona or plasma treatment. The PSA 24 may be laminated or cast directly onto the polymer film 20, as desired. As a result, the surface treatment 26 is provided to increase receptivity of the polymer film 20 to the PSA 24.

An adhesive 28 is affixed to one or both sides of the vapor barrier film 18. If desired, the adhesive 28 optionally may be applied between the polymer film 12 and the ink layer 14, or between the ink layer 14 and the polymer film 16, as desired. The adhesive 28 suitably is a standard laminating adhesive.

Total thickness of the appliqué 10 advantageously may be less than 4 mils. Around 1.5 mils to around 2 mils of thickness may be attributed to the PSA 24 and the adhesive 28. Likewise, around 2 mils of thickness may be attributed to the polymer films 12, 16, and 20, the ink layer 14, and the vapor barrier film 18. Because of such a thin profile, the appliqué 10 reduces weight.

It may be desirable to provide an increased thickness for the polymer film 20. An increased thickness of the polymer film 20 results in a higher dielectric breakdown voltage. With a greater thickness, the polymer film 20 can withstand an even higher electrical potential before undergoing dielectric breakdown, thereby increasing protection against lightning strike. However, increasing the thickness of the polymer film 20 also results in increased weight and/or decreased conformability to complex surface curvatures. Thus, a desire for increased dielectric strength for the polymer film 20 should be balanced with an increase in weight and a decrease in conformability.

In addition, the appliqué 10 advantageously may fatigue or crack like paint before significant disbond of the appliqué may occur, such as at points, like joints or fasteners used on aircraft structure, where air may attempt to exit. Further, the appliqué 10 is tatterable so that it will shred during flight of an aircraft, thereby limiting progress of any peels that may have initiated from maintenance damage or rain impingement at appliqué edges. The appliqué 10 is removable by peeling, when desired, for inspection or replacement, but advantageously remains adhered during flight.

Advantageously, the appliqué 10 can be fabricated at low cost. The appliqué 10 can be fabricated by commercial large-scale fabrication processes such as laminating, casting, and extruding, as desired, the polymer films 12, 16, and 20, and the vapor barrier film 18, that are all commercially available off-the-shelf or as made-to-order. As a result, the appliqué 10 can be fabricated in large quantities, thereby achieving economies of scale in fabrication costs. While such a construction may negligibly increase stiffness (because elongation may be slightly reduced), costs may be reduced by almost an order of magnitude over current appliqués.

From the foregoing discussion, multilayer construction of the appliqué 10 advantageously allows incorporation of the polymer film 12 as a top layer which provides high durability, UV stability, abrasion resistance, and superior gloss (whether high or low) using a defined texture. In addition, performance characteristics of the appliqué 10 are flexible. That is, performance and aesthetics of the appliqué 10 can be tailored to a desired application. This flexibility is achieved because the polymer film 16 or the ink layer 14 may be provided or omitted as desired. For example, the polymer film 16 provides strength and physical properties for coating application and removal. In addition, the polymer film 16 or the ink layer 14 may be provided as desired for operational characteristics, such as anti-static purposes, or for aesthetic purposes, such as providing color, graphic images or camouflage. To this end, any of the polymer films 12, 16, or 20, as desired for a particular application, can include surface patterns, and might include plasticizers, extenders, antioxidants, ultraviolet light stabilizers, dyes, pigments, emissivity agents (like silicon carbide), chopped or continuous fiber reinforcement, or the like, to provide desired color, gloss, hydrophobicity, anti-ice, or other surface characteristics. As a further example, optional chopped fibers can provide improved toughness in any of the polymer films 12, 16, or 20, and can provide anti-static properties in any of the polymer films 12 or 16 or the ink layer 14.

The appliqué 10 can be protected with single or double transfer protective paper or plastic film 30 to facilitate its application. In one exemplary embodiment, one sheet of protective paper overlies the PSA 24 (that is, the surface of the appliqué 10 that will interface and bond with the substrate 22) to protect the PSA 24 from dirt and to prevent the PSA 24 from inadvertently sticking to itself or other objects until the appliqué 10 is ready for installation. When the appliqué 10 is very thin, if desired the exposed surface of the polymer film 12 (that is, the topcoat) may also have similar protective paper 30 to reinforce it and to protect it during positioning and transfer. The protective paper 30 is peeled off following proper positioning. If desired, identifying information and instructions regarding how, where, and in what order to apply the appliqué 10 can be printed on the transfer paper 30 to simplify its placement and positioning. Alternately, the identifying information and instructions may be printed directly on the polymer film 12 (that is, the topcoat), if desired.

Figure 3:
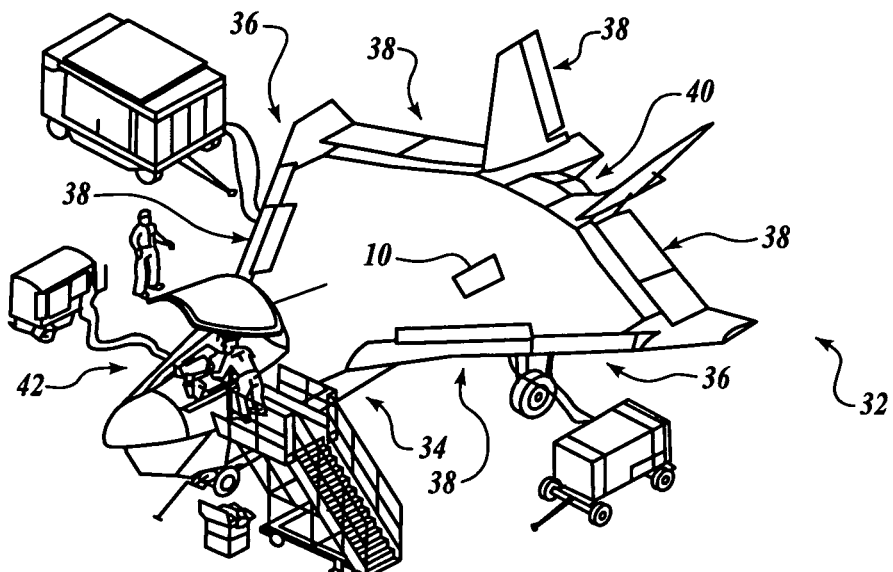
FIG. 3 is a perspective view of an aircraft covered with appliqués to provide a paintless coating.

Referring now to FIG. 3, an aircraft 32 advantageously is coated with a plurality of the appliqués 10. For purpose of clarity, only one of the appliqués 10 is shown. As is known the aircraft 32 includes a fuselage 34, a pair of wings 36, a plurality of control surfaces 38, at least one engine 40, and a cockpit 42. As is also known, the fuselage 34, wings, 36, and control surfaces 38 all have respective skins. Because aircraft are well known, further description of construction of the aircraft 32 is not necessary for an understanding of the present invention. According to the present invention, a plurality of the appliqués 10 is coated on the skins of the fuselage 34, wings, 36, and control surfaces 38. As a result, concurrent maintenance can occur on the aircraft 32, for example in the cockpit 42, while the appliqués 10 are inspected, repaired, or replaced, as desired.

Figure 4:
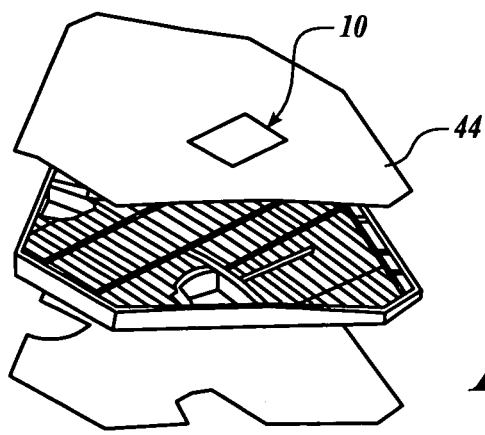
FIG. 4 is an exploded view of a wing-box of the aircraft of FIG. 3.

Referring now to FIG. 4, while curvature of the structure determines size and shape of the appliqué 10, a typical appliqué 10 applied to an upper wing skin 44 might be rectangular. To replace paint, the appliqués 10 cover all, substantially all, or merely a part of the surface of the aircraft 32 (FIG. 4) where paint would be used. Hot areas or areas particularly prone to erosion might require traditional treatments or coatings in addition to the appliqués 10.

Gores (not shown) are generally 2-dimensional, flat panels that are sized to conform to a 3-dimensional surface, similar to the sections of a baseball. During installation, the appliqué 10 often may be trimmed for achieving the final fit. The gores may have different thicknesses depending upon their intended location on the object. Thicker gores suitably are used in areas exposed to high wear or in impact zones.

The appliqués 10 typically are manufactured as multilayer "laminates" of flat materials that are flexible and readily bent. The material advantageously may be available substantially commercial off-the-shelf (COTS). Material of this form can easily be applied to both flat surfaces and simple curved surfaces such as cylinders, cones, and rolling bends. More complicated surfaces involving compound curvature can be covered if the material can be stretched or compressed to avoid wrinkling and tearing. If the material is not sufficiently deformable, cutting to permit overlapping, or wedge removal, as well as addition of darts, can be useful to extend coverage with a nominally flat appliqué 10. However, such approaches may be time consuming or may possibly damage the applied material if the material has any preferred orientation.

The appliqués 10 are typically made from flat material and accommodate curvature by inherent stretchiness and resilience of the appliqués 10. As discussed above, the appliqués 10 are suitably made from materials that are relatively forgiving and easy to work with. Flat appliqués can be used for cylindrical solids, flat surfaces, and any other large areas. Advantageously, it has been determined that an entire aircraft can be covered successfully using flat gores. The primary size of the appliqués 10 depends on the severity of the curvature of the surface they will cover. Smaller pieces are used in areas containing three dimensional curvature.

The appliqués 10 can be applied wet or dry using squeegees, mat knives, rubber rollers, wallpaper tools, and the like to place and smooth the films. Extracting any trapped air or water with a hypodermic syringe eliminates bubbles. Interfacing appliqués 10 usually are overlapped ¼ to 1½ inch or more, but butt joints are possible. The extent of overlap is limited because of weight and cost factors, but also because the appliqués 10 may stick more securely to the substrate 22 than to one another depending on the PSA 24 and the polymer film 12.

The appliqués 10 can be used on most aerospace metals, including 2024, 6061, 7075, and other aluminum alloys; all titanium alloys; high strength (low carbon) steels like 4130, 4340, and 9310; nickel alloys like INCONEL 718; and magnesium alloys protected with a Dow conversion coating. In addition, the appliqués 10 can be used on composite structures. At the interface between carbon fiber-reinforced composites and metallic structure, the appliqués 10 reduce galvanic corrosion by reducing access of electrolytes to the metal surfaces. That is, the appliqués 10 seal moisture and aircraft fluids away from the metals (conductors).

Now that details have been set forth regarding components of the appliqué 10 and regarding exemplary system environments in which appliqués of the present invention may be used, various preferred and alternate implantations of appliqués according to the present invention will now be explained. Like reference numbers are used to refer to components that have been previously explained. For the sake of brevity, their details will not be repeated.

Figure 5:
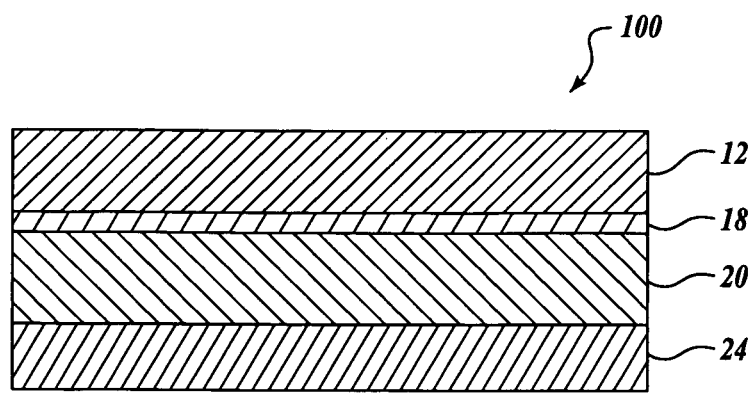
FIG. 5 is a schematic cross-section of an appliqué.

Referring now to FIG. 5, a presently preferred appliqué 100 includes the polymer film 12, the vapor barrier 18, the polymer film 20, and the PSA 24. In a presently preferred embodiment, the polymer film 12 includes a cast version of Boeing Material Specification 10-60 (BMS 10-60) polyurethane with a glossy texture or matte texture as desired. The vapor barrier 18 preferably includes a thin aluminum foil (approximately 0.3 mils thick). The polymer film 20 includes nylon or a laminate of PET and polyethylene. The PSA 24 preferably includes adhesive A8. The appliqué 100 may be painted over if desired for a particular application.

Figure 6:
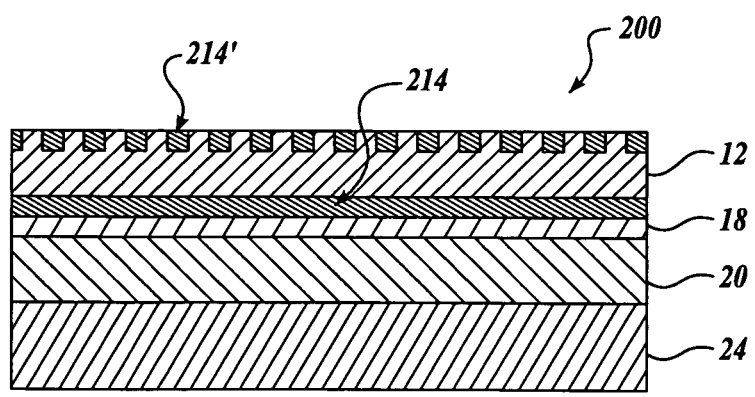
FIG. 6 is a schematic cross-section of another appliqué.

Referring now to FIG. 6, an appliqué 200 includes ink. The appliqué 200 includes the polymer film 12, the vapor barrier 18, the polymer film 20, and the PSA 24, all of which may be made from any of the materials discussed above in the context of the appliqué 10 (FIGS. 1 and 2). The ink may be provided as an ink layer 214 between the vapor barrier 18 and the polymer film 12 and/or an ink layer 214' provided above the polymer film 12. Details of the ink layers 214 and 214' are similar to those for the ink layer 14 (FIG. 2) and need not be repeated.

Figure 7:
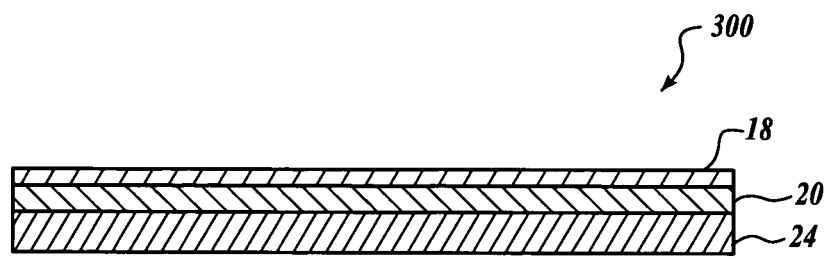
FIG. 7 is a schematic cross-section of another appliqué.

Referring now to FIG. 7, in an alternate embodiment an appliqué 300 includes the vapor barrier 18, the second polymer film 20, and the PSA 24, all of which may be made from any of the materials discussed above in the context of the appliqué 10 (FIGS. 1 and 2). It will be noted that the appliqué 300 does not include the polymer film 12. Instead, functionality of a "topcoat" may be provided by painting over the vapor barrier 18. Advantageously, the appliqué 300 provides lightning strike protection by cooperation of the vapor barrier 18 and the polymer film 20, as discussed above. In addition, applying paint (not shown) over the vapor barrier 18 permits appearance and aesthetics to be customized as desired for a particular application.

If desired, a protective treatment or primer could be applied to the vapor barrier 18 before painting. The protective treatment or primer can help protect the metal of the vapor barrier 18 from corrosion and/or can help enhance bonding of the paint to the vapor barrier. Given by way of non-limiting example, the protective treatment or primer can include anodizing, Alodine or other conversion coatings/treatments, electrodeposition, thin adhesives, primer, sol-gel, or the like.

Figure 8:
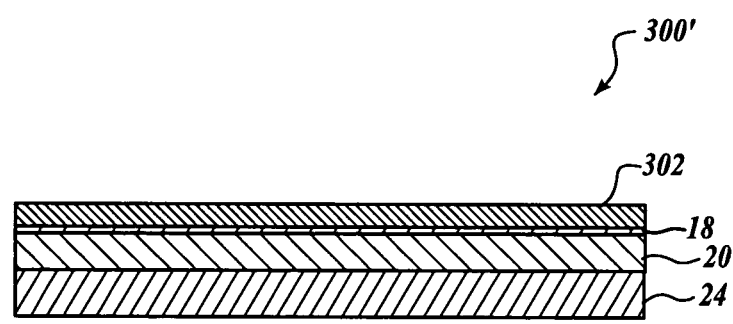
FIG. 8 is a schematic cross-section of another appliqué.

Referring now to FIG. 8, an appliqué 300' is similar to the appliqué 300 (FIG. 7) and includes the vapor barrier 18, the second polymer film 20, and the PSA 24, all of which may be made from any of the materials discussed above in the context of the appliqué 10 (FIGS. 1 and 2). The appliqué 300' also does not include the polymer film 12. Advantageously, a maskant 302 overlays and covers the vapor barrier 18. The maskant 302 suitably is removable. The use of the protective removable maskant 302 over the vapor barrier 18 advantageously helps maintain quality and integrity of the appliqué 300' during storage and installation. In addition, when the optional protective treatment or primer is used, the removable maskant 302 can help maintain the quality and bondability of the protective treatment or primer. The protective maskant 302 is removed prior to painting and/or lap joint installation. The maskant 302 may be left intact after installation to the extent possible, thereby providing protection for the appliqué 300' during part assembly and shipping. The removable maskant 302 typically may be a low cost polymer film, such as polyethylene, polypropylene, or polyester. Alternately, the maskant 302 may be paper with a low-tack pressure sensitive adhesive, thereby allowing the maskant 302 to be preferentially removed from the appliqué 300' after installation.

Figure 9:
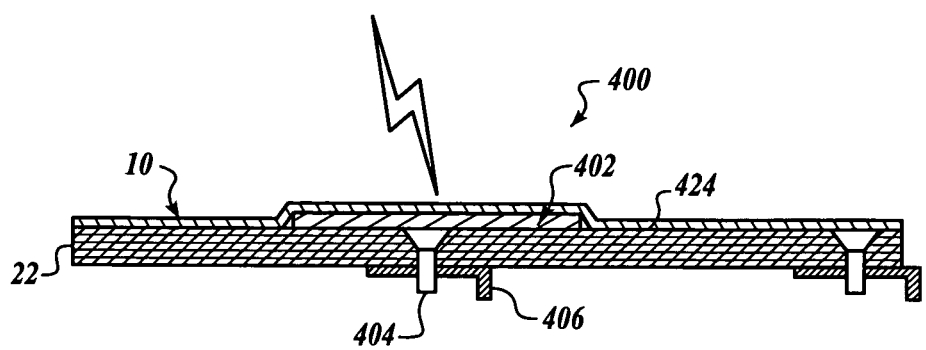
FIG. 9 is a side view of an appliqué covering a fastener.

Referring now to FIG. 9, in another alternate embodiment an appliqué assembly 400 provides increased lightning strike protection. It has been shown that electrical energy, such as that from lightning strikes, preferentially seeks fasteners that extend through a substrate and fasten the substrate to underlying structure. This is because the fastener presents a path to electrical "ground" (that is, the underlying structure) either directly or via graphite fibers that are exposed at the perimeter of the fastener hole. Although the polymer film 20 of the appliqué coating 10 can provide sufficient dielectric isolation between the metal foil 18 and the underlying aircraft structure 22, including fasteners, the overall weight of the appliqué coating 10 may be reduced by reducing the thickness of the polymer film 20, and preferably including additional dielectric material and/or voltage separation at fasteners or other discontinuities. Use of dielectric isolators or spacers is typical of many types of electrical products and systems, and can be used in concert with the appliqué 10 to provide additional weight savings. In FIG. 9 an additional dielectric layer 402 is provided on top of a fastener 404 that extends through the substrate 22. The fastener is attached to structure 406. Given by way of non-limiting example, the substrate 22 may be an aircraft skin, such as a wing skin, made from a composite material or metal; the fastener 404 may be any acceptable fastener as desired; and the structure 406 may be a stringer, a shear tie, or a rib. By interposing another layer of dielectric material between the lightning attachment point and the fastener 404, the dielectric layer 402 advantageously increases the maximum electrical potential between the exterior surface of the appliqué and the fastener 404, thereby reducing the likelihood of breakdown at the fastener. Thus, the appliqué assembly 400 is well-suited for covering fasteners that extend into aircraft wing boxes that are wetted with fuel.

The dielectric layer 402 suitably is made from the same material as the polymer film 20 (FIG. 2). The dielectric layer 402 may be cut into any shape as desired to cover the fastener 404. Given by way of non-limiting example, the dielectric layer 402 may be cut into a strip or may be cut into a round shape that at least covers the head of the fastener 404. In order to help the dielectric layer 402 adhere to the substrate 22 and the fastener 404, a PSA 424 may be applied to an underside of the dielectric layer 402. The PSA 424 suitably is similar to the PSA 24 (FIG. 2), and details regarding its construction need not be repeated.

Alternate implementations also may provide for increased lightning strike protection in the vicinity of fasteners. For example, thickness of the polymer film 20 could be increased over a fastener, or an extra layer of the polymer film 20 could be provided over a fastener. Further, materials with high dielectric breakdown properties, such as PET or nylon or perfluoroalkoxy (PFA), may be used as the polymer film 20 over a fastener. Also, thickness of the PSA 24 may be increased over a fastener to provide additional spacing and therefore voltage separation.

Figure 10:
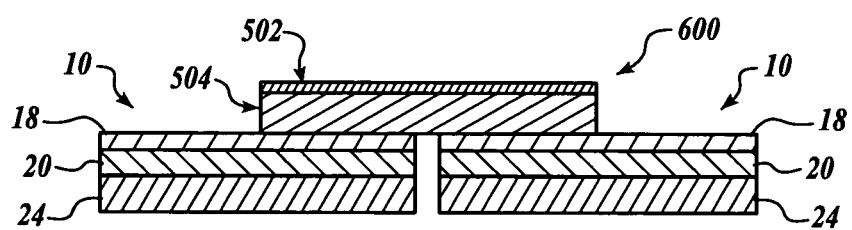
FIG. 10 is a side view of abutting appliqués.

Referring now to FIG. 10, an edge finish 600 provides a physical barrier for butt joints between adjacent appliqués 10. The edge finish 600 advantageously protects the underlying substrate (not shown) from ultraviolet (UV) radiation, moisture, rain, air impingement, and the like. The edge finish 600 may also be used with lap joints between overlapping appliqués 10.

The edge finish 600 suitably includes a metal foil 502 and a polymer film 504 that underlies the metal foil 502. Alternately, the foil 502 may underlay the polymer film 504. Alternately, the edge finish 600 may include either the metal foil 502 or the polymer film 504. An adhesive (not shown to enhance clarity) provided on an underside of the edge finish 600 affixes the edge finish 600 to the appliqués 10 or other structures as desired. The adhesive may be a PSA, a thermosetting adhesive, or a thermoplastic/hot melt adhesive, as desired for a particular application. Other "wet" sealant products, such as for example metal filled epoxies or polysulfides, may also be used to provide physical barrier properties.

The appliqués 10 shown in FIG. 10 illustrate only the vapor barrier 18, the polymer film 20, and the PSA 24 by way of non-limiting example. Any of the components of the appliqué 10 (FIG. 2) may be included as desired for a particular purpose. The non-limiting example of the appliqué 10 shown in FIG. 10 is provided for illustrative purposes only, and additional components are not shown for purposes of clarity of the drawing.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An appliqué coating consisting of:
   a first polymer film layer;
   an ink layer;
   a second polymer film layer;
   a vapor barrier layer;
   a third polymer film layer; and
   a pressure sensitive adhesive layer,
   wherein the vapor barrier layer includes a metal foil layer,
   wherein the vapor barrier layer is configured to disperse an environmental electrical charge,
   wherein a first surface of the first polymer film layer is adhesively attached to a first surface of the ink layer using an adhesive,
   wherein a second surface of the ink layer is adhesively attached to a first surface of the second polymer film layer using the adhesive,
   wherein a second surface of the second polymer film layer is adhesively attached to a first surface of the vapor barrier layer using the adhesive,
   wherein a second surface of the vapor barrier layer is adhesively attached to a first surface of the third polymer film layer using the adhesive, and
   wherein a second surface of the third polymer film layer is adhesively attached to a first surface of the pressure sensitive adhesive layer.

2. The appliqué coating of claim 1, wherein the appliqué coating has a total thickness of less than four (4) mils.

3. The appliqué coating of claim 1, wherein the first polymer film layer is microporous to enable the environmental electric charge to migrate to the vapor barrier layer.

4. The appliqué coating of claim 2, wherein the pressure sensitive adhesive layer and the adhesive account for between one-and-a-half (1.5) mils and two (2) mils of the total thickness of the appliqué coating.

5. The appliqué coating of claim 3, wherein the second polymer film layer is microporous to enable the environmental electric charge to migrate to the vapor barrier layer.

6. An aircraft comprising:
   a pair of wings, each of the wings having skin;
   a fuselage having skin;
   control surfaces having skin; and
   an appliqué coating adhesively attached to a portion of the skin, the appliqué coating consisting of:
   a first polymer film layer;
   an ink layer;
   a second polymer film layer;
   a vapor barrier layer;
   a third polymer film layer; and
   a pressure sensitive adhesive layer,
   wherein the vapor barrier layer includes a metal foil layer,
   wherein the vapor barrier layer is configured to disperse an environmental electrical charge,
   wherein a first surface of the first polymer film layer is adhesively attached to a first surface of the ink layer using an adhesive,
   wherein a second surface of the ink layer is adhesively attached to a first surface of the second polymer film layer using the adhesive,
   wherein a second surface of the second polymer film layer is adhesively attached to a first surface of the vapor barrier layer using the adhesive,
   wherein a second surface of the vapor barrier layer is adhesively attached to a first surface of the third polymer film layer using the adhesive, and
   wherein a second surface of the third polymer film layer is adhesively attached to a first surface of the pressure sensitive adhesive layer.

7. The aircraft of claim 6, wherein the appliqué coating has a total thickness of less than four (4) mils.

8. The aircraft of claim 7, wherein the pressure sensitive adhesive layer and the adhesive account for between one-and-a-half (1.5) mils and two (2) mils of the total thickness of the appliqué coating.

9. The aircraft of claim 6, wherein the first polymer film layer is microporous to enable the environmental electric charge to migrate to the vapor barrier layer.

10. The aircraft of claim 9, wherein the second polymer film layer is microporous to enable the environmental electric charge to migrate to the vapor barrier layer.

11. A structure comprising:
a panel; and
an appliqué coating attached to a portion of a surface of the panel, the appliqué coating consisting of:
a first polymer film layer;
an ink layer;
a second polymer film layer;
a vapor barrier layer;
a third polymer film layer; and
a pressure sensitive adhesive layer,
wherein the vapor barrier layer includes a metal foil layer,
wherein the vapor barrier layer is configured to disperse an environmental electrical charge,
wherein a first surface of the first polymer film layer is adhesively attached to a first surface of the ink layer using an adhesive,
wherein a second surface of the ink layer is adhesively attached to a first surface of the second polymer film layer using the adhesive,
wherein a second surface of the second polymer film layer is adhesively attached to a first surface of the vapor barrier layer using the adhesive,
wherein a second surface of the vapor barrier layer is adhesively attached to a first surface of the third polymer film layer using the adhesive, and
wherein a second surface of the third polymer film layer is adhesively attached to a first surface of the pressure sensitive adhesive layer.

12. The structure of claim 11, wherein the panel includes a composite panel.

13. The structure of claim 12, wherein the composite panel includes a fiber-reinforced resin composite panel.

14. The structure of claim 11, wherein the panel includes a metal panel.

15. The structure of claim 11, wherein the appliqué coating has a total thickness of less than four (4) mils.

16. The structure of claim 15, wherein the pressure sensitive adhesive layer and the adhesive account for between one-and-a-half (1.5) mils and two (2) mils of the total thickness of the appliqué coating.

17. The structure of claim 11, wherein the first polymer film layer is microporous to enable the environmental electric charge to migrate to the vapor barrier layer.

18. The structure of claim 17, wherein the second polymer film layer is microporous to enable the environmental electric charge to migrate to the vapor barrier layer.

19. The structure of claim 11, wherein the ink layer provides anti-static characteristics to the appliqué.

20. The structure of claim 11, wherein the metal foil layer comprises copper, nickel, gold, or titanium.

* * * * *